United States Patent
Li et al.

(10) Patent No.: US 6,351,770 B1
(45) Date of Patent: Feb. 26, 2002

(54) METHOD AND APPARATUS FOR AUTOMATING THE CREATION OF SERVICE ACTIVATION REQUESTS

(75) Inventors: Yu-Hsien Li, Cupertino; Sai V. Ramamoorthy, Sunnyvale, both of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/449,030

(22) Filed: Nov. 24, 1999

(51) Int. Cl.[7] .......................... H04M 3/42; G06F 15/16
(52) U.S. Cl. ..................... 709/225; 370/259; 379/201
(58) Field of Search ........................ 370/259; 379/201; 709/223, 224, 225, 226, 102, 103, 104; 705/600

(56) References Cited

U.S. PATENT DOCUMENTS

| | | | | |
|---|---|---|---|---|
| 5,650,994 A | * | 7/1997 | Daley .......................... | 370/259 |
| 5,881,131 A | * | 3/1999 | Farris et al. .................. | 379/27 |
| 6,115,737 A | * | 9/2000 | Ely et al. ..................... | 709/203 |
| 6,201,860 B1 | * | 3/2001 | Kullstrom et al. .......... | 379/201 |

\* cited by examiner

Primary Examiner—Ricky Ngo
(74) Attorney, Agent, or Firm—Skjerven Morrill MacPherson LLP; Samuel G. Campbell, III

(57) ABSTRACT

An automated method and apparatus for classifying a customer service activation request (SAR) according to whether repeatable, schedulable, or scaleable elements are present. When the request has no repeating elements, a traditional SAR is forwarded and serviced by the network management system according to provisions well-known in the art. In the more complex case, however, a SAR comprises elements that are both repeatable and schedulable and is thus classified as a service activation module (SAM). An automated process first determines the starting quality of service (QoS) level at the beginning of the service life cycle requested by the customer. The process next determines the life cycle ending time as well as the trigger times at which elements repeat or are reinitiated. In some embodiments of the present invention, the SAM is examined for resource availability. If one or more resources are not available during the service life cycle, the process generates a report. In a further alternate embodiment, a set of templates representing various QoS levels are constructed and modified to reflect the fact that certain services are not available. If all resources are available, the elements of the SAM are transmitted to a well-known provisioning process for fulfillment. The present invention thus provides faster and more reliable service provisioning for extremely complex, time-dependent SARs including repeating sub-elements and the necessary scaling to enable expansion and enhancement of customer service.

20 Claims, 2 Drawing Sheets

METHOD AND APPARATUS FOR AUTOMATING THE CREATION OF SERVICE ACTIVATION REQUESTS

BACKGROUND OF THE INVENTION

1. Field of the Invention

The present invention relates to telecommunications network management systems and, in particular, to provisioning services across a network or a set of networks.

2. Description of the Related Art

Network operators and network customers request the activation of services by use of simple service orders known as service activation requests (SARs), often provided on paper hardcopy. SARs are processed based upon customer demand and their requested activation date. Customers may demand immediate activation or delayed activation in the short- or long-term, i.e., service requests may have various levels of time-criticality. In most situations this is a highly manual and labor- and paper-intensive process.

Customers may also require repeating services, such as a certain quality of service (QoS) every weekday and a different QoS on weekends.

To add a further dimension to the problem, SARs (including service changes) may also involve complex interactions between many disparate network management systems (NMSs) and Element Management Systems (EMSs) and the elements therein and thus may not be confined to a single network resource under local control. For instance, a customer may request end-to-end service between two distant cities. Provision of this service may require obtaining dedicated bandwidth on several network resources owned and/or controlled by different parties (NMSs, or EMSs), such as a metropolitan area network in the originating city, a long-haul transport network, and a metropolitan network in the destination city.

This complexity introduces a level of difficulty in automating the creation of service activation requests. Automated SARs must properly include all the necessary detail to meet the customers requirements while not overburdening the operators of the network management system tasked to satisfy customer service requests.

What is needed is a method of automatically generating complex service activation requests including all necessary resources and connections in response to a customer's multi-element, time-critical request.

SUMMARY

Presently disclosed is an automated method and apparatus for examining and classifying a complex customer service activation request (SAR) to determine whether repeatable, schedulable, or scaleable elements are present and provisioning service(s) accordingly. In cases where the request is a simple one with no repeating elements, a traditional SAR is placed and serviced by the network management or element management systems according to means well-known in the art. In the more complex case, however, the SAR comprises elements that are both repeatable and schedulable and is thus classified as a service activation module (SAM). The automated process of the present invention determines the starting quality of service (QoS) level at the beginning of the service time period (the service life cycle) requested by the customer. The process also determines the overall length of the service required as well as the trigger points at which elements of the customer's service request repeat or are reinitiated (e.g., a change in QoS). The process thus creates a SAM comprised of a set of SARs and QoS change trigger points organized by time and QoS. In some alternate embodiments of the present invention, the SAM is examined by the network management system for resource availability. If one or more resources are not available during the service life cycle, a report is generated to indicate that certain resources are unavailable. In a further alternate embodiment, a set of templates representing various QoS levels can be downgraded to reflect the fact that certain QoS-identified services are not currently available. If, however, all resources are available, the SAM is transmitted to the NMS/EMS provisioning process. The provisioning process then automatically and rapidly creates and transmits configuration messages to the affected resources.

The present invention thus provides faster and more reliable service provisioning for extremely complex, time-dependent service activation requests including repeating elements. As such SARs/SAMs are becoming more common in modern network operations, the automated servicing method of the present invention enables the necessary scaling to enable expansion and enhancement of customer service.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Introduction

Figure 1:
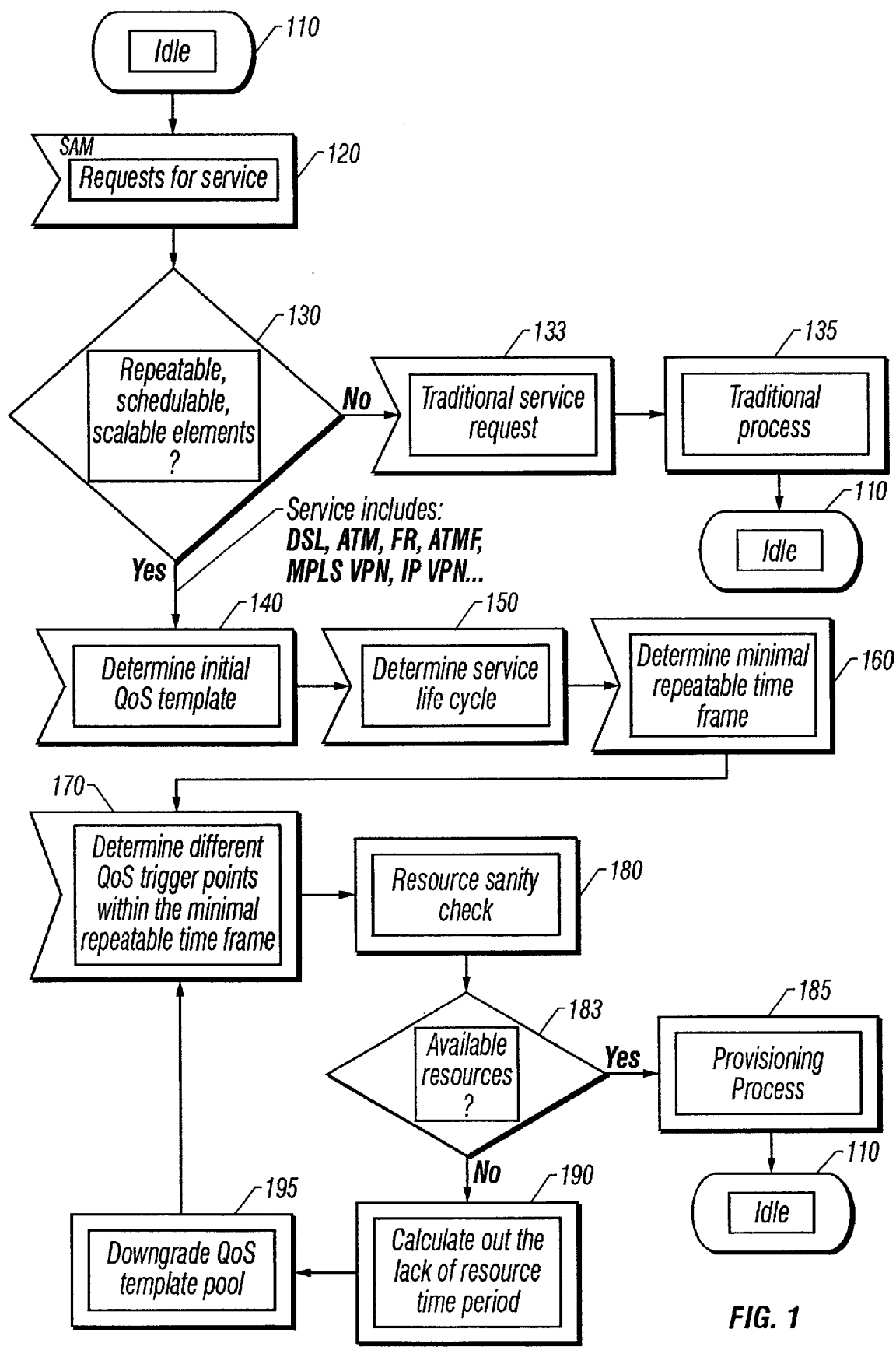
FIG. 1 is a high level flowchart of the process according to one embodiment of the present invention.

Network operators and administrators currently activate services on customer demand by communicating directly with the affected resource using the NMS and/or the low-level EMS (e.g., by using a graphical user interface or command line interface to configure a router). As currently known, this is a highly manual and paper-intensive process.

Network Management Systems are further described in H. Wang, *Telecommunications Network Management* (McGraw-Hill 1999), incorporated herein by reference in its entirety.

As an example of a complex set of service activation requests (SARs), also referred to in total as a service activation module (SAM), consider the following customer request:

a) Frame Relay wide area network (WAN) service with low bandwidth, longer re-route delay, and maximum 5% down time from 6:00 a.m. Monday through 12:00 p.m. Friday;

b) higher constant bandwidth, better burst control, and maximum 0.1% down time from 12:00 p.m. Friday to 12:00 p.m. Sunday; and c) shutdown/running redundant backup service from 12:00 p.m. Sunday to 6:00 a.m. Monday.

Although a Frame Relay SAM is described by way of example, those skilled in the art will realize that SARs for other services besides Frame Relay, such as but not limited to digital subscriber line (DSL), asynchronous transfer mode (ATM), multi-protocol label switching (MPLS) virtual private network (VPN), or internet protocol (IP) VPN, can be used. Accordingly, the invention is not limited to any particular type of service.

The above SAM consists of a number of repeating elements defined by their required quality of service (QoS) parameters. For example, the customer has requested Frame Relay service having a QoS expressed as "low bandwidth, longer re-route delay, and maximum 5% down time" during the work week. But from midnight Friday to midnight Sunday, it has requested a higher QoS, specifically "higher constant bandwidth, better burst control, and maximum 0.1% down time." Finally, a period of low QoS ("shutdown/running redundant backup service") is all that it needs in the early Monday hours. This pattern QoS elements repeats every week.

In this example, the SAM life cycle is infinite; it repeats a weekly element indefinitely or until stopped. Normally, a customer would construct a SAM with a specified life cycle (such as a calendar year, month, week, or day) beginning and ending at a time certain to facilitate billing.

A SAM can also be described in terms of trigger times. For example, the switch from the highest QoS to the lowest is a QoS change event with a trigger time (or point) of 12:00 p.m. Sunday.

Other SAMs may have one-time-only (non-repeating) events such as "bring up an IP VPN with 2.5 Mbps bandwidth and 0.01% down time at 1 p.m. Oct. 20, 1999 for 3 hours".

Note too that QoS may be defined by any of a plethora of quality or class of service parameters known in the art today or developed in the future. For example, QoS can be specified by access control list (ACL; also known as policy-based routing) rule sets, L3 queuing policy, bandwidth, down time, type of service (e.g., frame relay, IP, etc.), IP packet class of service (CoS), and so on. Those skilled in the art readily appreciate that QoS parameters other than those listed here can be used. Accordingly, the invention is not limited to any particular QoS parameter or parameter set.

The various parameters defining a QoS level may be grouped into "templates," thus simplifying the SAM definition. For instance, a QoS template defined as having 5% down time, medium bandwidth, enterprise-wide access control can be referred to as "Bronze" service. Similarly, a 0.1% down time, high bandwidth, administrator-only access control QoS template can be referred to as "Gold" service. The system administrator then, in some embodiments of the present invention, allows the customers in this example only the choice between Bronze and Gold service levels.

Obviously, other service levels (e.g., Silver, Platinum, Rubidium, etc.) can be defined.

This approach avoids the necessity of keeping a database of all possible combinations in favor of a small set of discrete templates of QoS parameters and simplifies SAM construction.

The present invention also provides an advantage over current manual SAR fulfillment methods by allowing the customer to specify with precision the type and level (quality) of service it requires at any and every given time. This is more efficient and cost-effective for the customer because it no longer has to pay (or can pay less) for services and/or QoS levels it does not need outside of certain times. The present invention is also more scaleable that prior methods because of its automated nature.

SAM Creation Process

The process whereby the automated SARs are created from customer SAMs and processed is shown in FIG. 1. Starting from an idle state 110, the process receives one or more service activation modules (SAMs) 120. Each SAM is evaluated to determine if it contains repeatable, schedulable, and/or scaleable elements in step 130. If not, i.e., if the SAM is a simple, one-time request (a "traditional" SAR) 133, the SAM is processed and fulfilled (i.e., the service requested is provisioned) according to well-known methods by the NMS or EMS as appropriate to the service requested.

If the SAM contains repeatable elements, as expected, the process next determines which QoS parameters are to be set. In one embodiment of the present invention, shown in FIG. 1, the system determines 140 which QoS template, out of a pre-defined pool, most closely matches the requested QoS parameter set for each repeatable element.

Next, in step 150, the service life cycle beginning and ending times are determined from the SAM. The minimal repeatable time frames (otherwise referred to as element trigger times) are likewise determined by means well-known in the art, such as reading directly from the SAM, in step 160, and verifying validity of the request (not shown). One-time-only (non-repeating) and repeating events including QoS changes are also identified by their respective trigger points (such as their service modification times) in step 170.

In one embodiment of the present invention, also shown in FIG. 1, the process next performs a sanity check 180 on system resource availability to determine if the necessary resources (such as bandwidth or access control list database information) are currently available for provisioning. If all required resources are found available in step 183, the resources are automatically provisioned for the requesting customer by means well-known in the art in step 185. Such means include, but are not limited to, automatic transmission of provisioning instructions to the affected NMS or EMS. The process then returns to the idle state 110 to await another SAM 120.

If, however, one or more resources are unavailable in step 183, the process calculates 190 the time period during which the resources will not be provided. Additionally, in some embodiments, the process produces an appropriate resource shortfall report (not·shown). The pool of QoS templates is then downgraded accordingly to reflect the unavailability to future SAMs of certain QoS templates due to the lack of resources to support those templates.

The order in which the steps of FIG. 1 are performed is purely illustrative in nature. In fact, the steps of FIG. 1 can be performed in any order or in parallel, unless otherwise indicated by the present disclosure.

Figure 2:
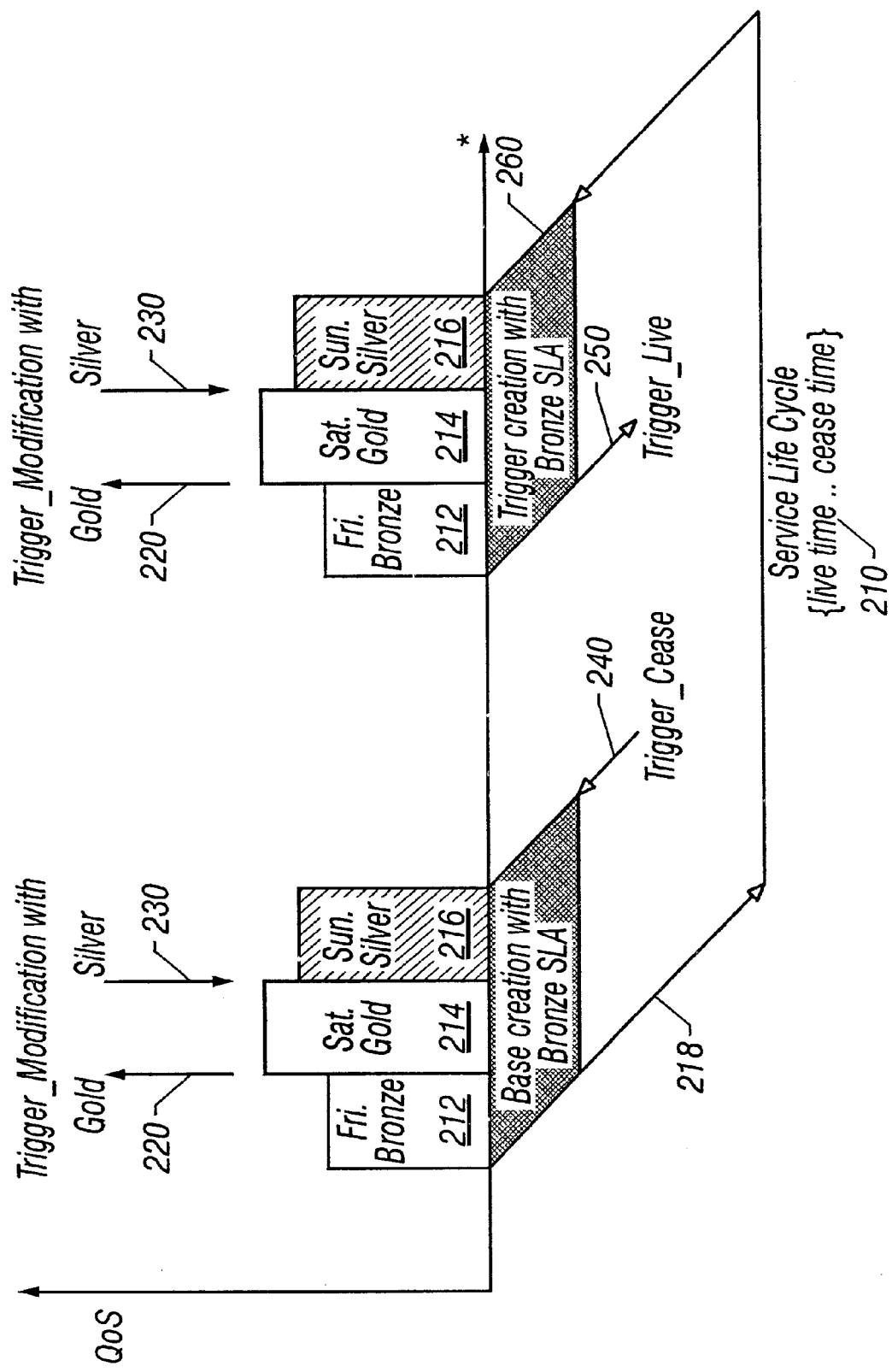
FIG. 2 is a schematic timing diagram example of the repeatable elements and trigger points over the life cycle of a SAM, according to one embodiment of the present invention.

FIG. 2 shows, in timeline form, a further example of SAM elements defined by QoS templates and triggers according to some embodiments of the present invention. Here, three templates are employed: Bronze, Gold, and Silver. Service life cycle 210 extends only nine days—from Friday to the second following Sunday.

During life cycle 210, QoS Bronze template 212 is first provisioned at life cycle beginning time 218. QoS trigger time 220 signals a service quality increase to QoS Gold template 214. Then, at 12:00 p.m. Saturday, a second QoS change event 230 signals a service quality decrease to QoS Silver template 216.

Next, at 12:00 p.m. Sunday, QoS trigger ("Trigger_Cease") 240 signals a temporary cessation of all service until the following Thursday at 12:00 p.m. QoS trigger ("Trigger_Live") 250 signals re-provisioning of Bronze QoS template service 212. The repeating elements defined by triggers 220 and 230 and QoS templates 214 and 216 are then repeated before life cycle ending time 260.

Alternate Embodiments

In some alternate embodiments, the resource sanity checking procedure discussed above (steps 180, 183, 190, and 195 of FIG. 1) are omitted. In such an embodiment, once the QoS trigger times are determined in step 170, provisioning step 185 follows directly.

In a further alternate embodiment, QoS templates are not used and the process processes and provisions QoS parameters individually. Accordingly, step 195 (if present) consists only of marking certain QoS parameters as unavailable.

The method of the present invention may be performed in either hardware, software, or any combination thereof, as those terms are currently known in the art. In particular, the present method may be carried out by software, firmware, or microcode operating on a computer or computers of any type. Additionally, software embodying the present invention may be in the form of computer instruction in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of responding to a service activation request comprising the steps of:
    analyzing a service activation module (SAM) having one or more elements;
    identifying zero or more repeating elements in said SAM, said repeating elements each having a quality of service;
    determining a life cycle of said SAM, said life cycle having a beginning time and an ending time; and
    determining a trigger time for each said repeating element;
wherein said life cycle beginning time, said life cycle ending time, and said trigger times are recorded in a data structure for each SAM.

2. The method of claim 1, further comprising the step of provisioning said SAM according to the contents of said data structure.

3. The method of claim 2, further comprising selecting a template for each said repeating element wherein said templates are recorded in said data structure for each SAM.

4. The method of claim 3 wherein said template is based on said repeating element quality of service.

5. The method of claim 4, wherein said determining said trigger time further comprises evaluating available resources and adjusting a pool of said QoS templates if said resources are inadequate.

6. A computer system for responding to a service activation request, comprising computer instructions for:
    analyzing a service activation module (SAM) having one or more elements;
    identifying zero or more repeating elements in said SAM, said repeating elements each having a quality of service;
    determining a life cycle of said SAM, said life cycle having a beginning time and an ending time; and
    determining a trigger time for each said repeating element;
wherein said life cycle beginning time, said life cycle ending time, and said trigger times are recorded in a data structure for each SAM.

7. The computer system of claim 6, further comprising the step of provisioning said SAM according to the contents of said data structure.

8. The computer system of claim 7, further comprising selecting a template for each said repeating element wherein said templates are recorded in said data structure for each SAM.

9. The computer system of claim 8 wherein said template is based on said repeating element quality of service.

10. The computer system of claim 9, wherein said determining said trigger time further comprises evaluating available resources and adjusting a pool of said QoS templates if said resources are inadequate.

11. A computer-readable storage medium, comprising computer instructions for:
    analyzing a service activation module (SAM) having one or more elements;
    identifying zero or more repeating elements in said SAM, said repeating elements each having a quality of service;
    determining a life cycle of said SAM, said life cycle having a beginning time and an ending time; and
    determining a trigger time for each said repeating element;
wherein said life cycle beginning time, said life cycle ending time, and said trigger times are recorded in a data structure for each SAM.

12. The computer-readable storage medium of claim 11, further comprising the step of provisioning said SAM according to the contents of said data structure.

13. The computer-readable storage medium of claim 12, further comprising selecting a template for each said repeating element wherein said templates are recorded in said data structure for each SAM.

14. The computer-readable storage medium of claim 13 wherein said template is based on said repeating element quality of service.

15. The computer-readable storage medium of claim 14, wherein said determining said trigger time further comprises evaluating available resources and adjusting a pool of said QoS templates if said resources are inadequate.

16. A computer data signal embodied in a carrier wave, comprising computer instructions for:
    analyzing a service activation module (SAM) having one or more elements;
    identifying zero or more repeating elements in said SAM, said repeating elements each having a quality of service;
    determining a life cycle of said SAM, said life cycle having a beginning time and an ending time; and
    determining a trigger time for each said repeating element;
wherein said life cycle beginning time, said life cycle ending time, and said trigger times are recorded in a data structure for each SAM.

17. The computer data signal of claim 16, further comprising the step of provisioning said SAM according to the contents of said data structure.

18. The computer data signal of claim 17, further comprising selecting a template for each said repeating element wherein said templates are recorded in said data structure for each SAM.

19. The computer data signal of claim 18 wherein said template is based on said repeating element quality of service.

20. The computer data signal of claim 19, wherein said determining said trigger time further comprises evaluating available resources and adjusting a pool of said QoS templates if said resources are inadequate.

* * * * *